(No Model.)
A. SWEET.
HARNESS FOR KICKING COWS.
No. 387,326. Patented Aug. 7, 1888.
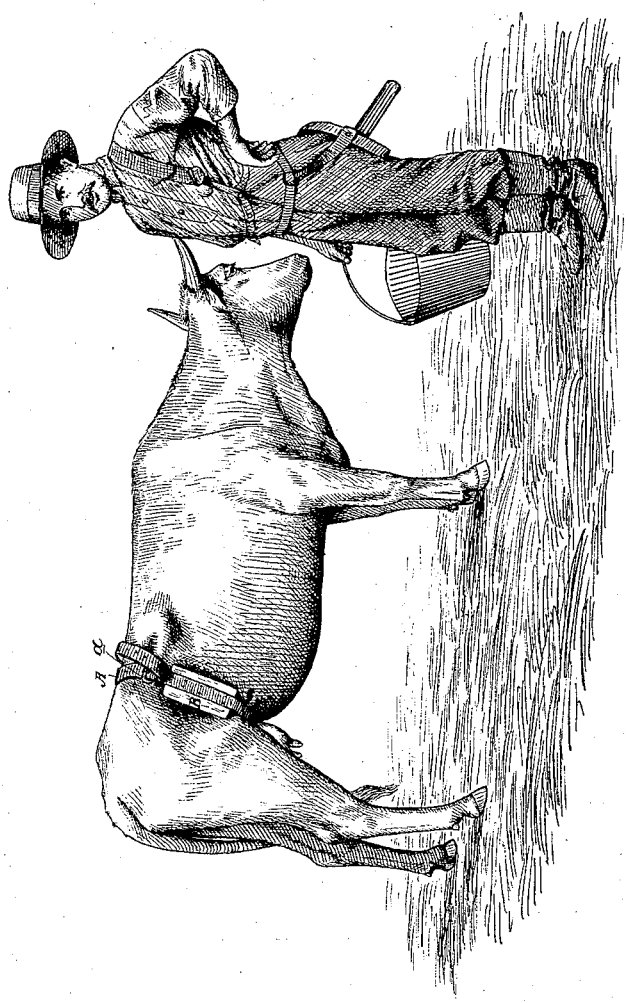
Witnesses,
Geo. H. Strong
Inventor,
Alonzo Sweet.
By Dewey & Co.
Atty

UNITED STATES PATENT OFFICE.

ALONZO SWEET, OF FERNDALE, CALIFORNIA.

HARNESS FOR KICKING COWS.

SPECIFICATION forming part of Letters Patent No. 387,326, dated August 7, 1888.

Application filed September 24, 1887. Serial No. 250,631. (No model.)

*To all whom it may concern:*

Be it known that I, ALONZO SWEET, of Ferndale, Humboldt county, State of California, have invented an Improvement in Harness for Kicking Cows; and I hereby declare the following to be a full, clear, and exact description of the same.

My invention relates to the class of devices for keeping cows from kicking when they are being milked; and my invention consists in a strap passing around the body of the cow over the flanks and loins, and having secured to it a block which is pressed into the flank just in front of the hip-bone, as I shall hereinafter fully describe.

The object of my invention is to keep the cow from kicking by placing an obstruction before the hip-bone, so that its movement is completely arrested.

Referring to the accompanying drawing for a more complete explanation of my invention, the figure is a perspective view of my invention, showing its application.

A is a strap provided with a suitable fastening—such as a buckle, *a*—on one end.

B is the block, which is secured to the strap. The strap is placed on the cow in such a manner that it passes over the back and down on each side over the loins and flanks and under just in front of the udder, the block B pressing into the flank in front of the hip-bone and in its way, so that when firmly strapped in place it effectually prevents any movement of the joint, and thereby prevents the cow from kicking.

Having thus described my invention, what I claim as new, and desire to secure by Letters Patent, is—

The harness for kicking cows, comprising the strap for encircling the body and the block secured to the strap for pressing on the flank directly in front of the hip-bone, substantially as herein described.

In witness whereof I have hereunto set my hand.

ALONZO SWEET.

Witnesses:
   S. H. NOURSE,
   H. C. LEE.